United States Patent [19]
Drahm et al.

[11] Patent Number: 5,854,430
[45] Date of Patent: Dec. 29, 1998

[54] CORIOLIS MASS FLOW SENSOR

[75] Inventors: Wolfgang Drahm, Zwingen, Switzerland; Christian Matt, Lörrach, Germany

[73] Assignee: Endress + Hauser Flowtec AG, Reinach, Switzerland

[21] Appl. No.: 811,709

[22] Filed: Mar. 5, 1997

Related U.S. Application Data

[60] Provisional application No. 60/017,380 May 7, 1996.

[30] Foreign Application Priority Data

Feb. 4, 1997 [EP] European Pat. Off. ............ 97810059

[51] Int. Cl.⁶ .................................................. G01F 1/00
[52] U.S. Cl. ................................. 73/861.357; 73/861.354
[58] Field of Search ...................... 73/861.354, 861.355, 73/861.356, 861.357

[56] References Cited

U.S. PATENT DOCUMENTS

| | | | |
|---|---|---|---|
| 4,096,745 | 6/1978 | Rivkin et al. | 73/861.357 X |
| 4,680,974 | 7/1987 | Simonsen et al. | 73/861.357 |
| 4,747,312 | 5/1988 | Herzl . | |
| 4,793,191 | 12/1988 | Flecken et al. | 73/861.357 |
| 4,801,897 | 1/1989 | Flecken . | |
| 5,218,873 | 6/1993 | Lang . | |
| 5,230,254 | 7/1993 | Craft | 73/861.355 |
| 5,386,732 | 2/1995 | Scotto | 73/861.356 X |
| 5,398,554 | 3/1995 | Ogawa et al. | 73/861.357 |
| 5,488,870 | 2/1996 | Yoshimura et al. | 73/861.256 |
| 5,531,126 | 7/1996 | Drahm . | |
| 5,551,307 | 9/1996 | Kane et al. | 73/861.357 X |

FOREIGN PATENT DOCUMENTS

| | | |
|---|---|---|
| 0 448 913 | 10/1991 | European Pat. Off. . |
| 2 598 801 | 11/1987 | France . |
| 88/02475 | 4/1988 | WIPO . |
| 93/03336 | 2/1993 | WIPO . |

*Primary Examiner*—Ronald L. Biegel
*Attorney, Agent, or Firm*—Bose McKinney & Evans

[57] ABSTRACT

This Coriolis mass flow sensor (40, 50, 60, 70) can be inserted in a pipeline by means of an inlet-side and an outlet-side connecting element (402, 403; 502, 503; 602, 603; 702, 703). An oscillating system comprises at least one measuring tube (401; 501; 601; 701, 701'), through which a fluid to be measured flows in operation. The oscillations of the oscillating system are excited by means of an electromagnetic exciter arrangement (1, 2, 3, 4, 10) which has at least one low-resistance exciter coil (15; 251, 252; 35) fed from an exciter current source (6, 7), a core (13, 23, 33, 43, 53) containing a permanent magnet (12; 221, 222; 32; 42; 512, 522), and an armature (14, 24, 34, 44, 54, 104). The oscillating system can also be excited by interference vibrations which contain a frequency which is the same as the resonant frequency of the oscillating system, such that the measurement result is corrupted. To avoid this a capacitor is coupled to the coil in the manner of a parallel circuit and its capacitance (C) is selected as a function of the inductance (L) of the coil such that the resonant frequency of the electrical parallel resonant circuit which is formed by the capacitor and the coil is approximately equal to the mechanical resonant frequency of the oscillating system. A sensor (406, 506, 606, 706) for the inlet-side oscillations and a sensor (407, 507, 607, 707) for the outlet-side oscillations are arranged with the same distance between the center of the measuring tube and the inlet-side and the outlet-side connecting element, respectively.

6 Claims, 5 Drawing Sheets

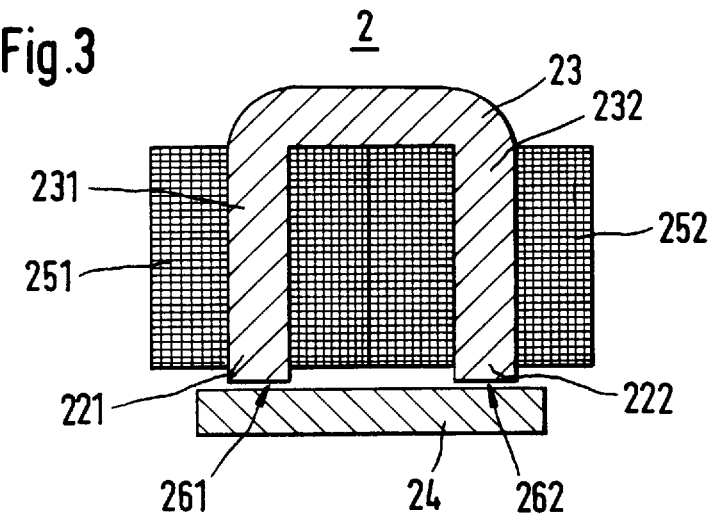
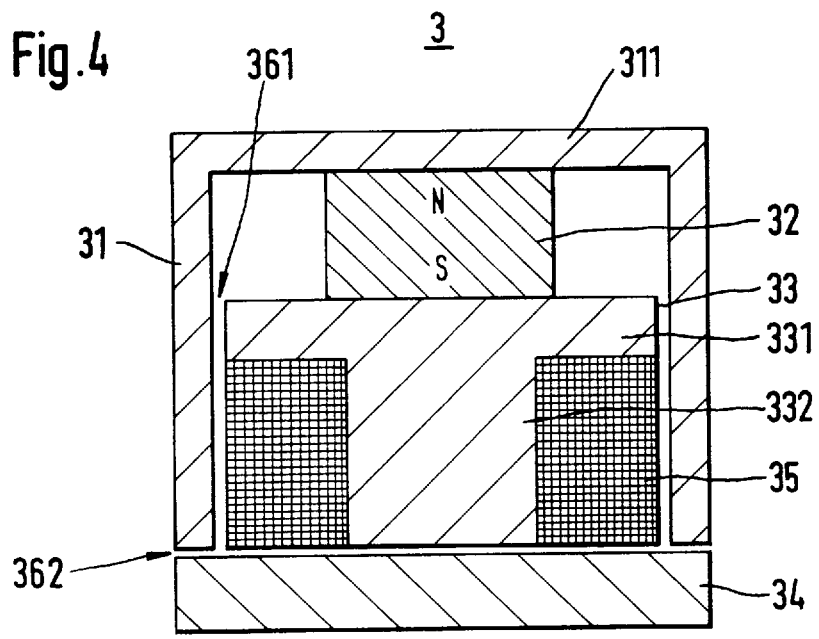

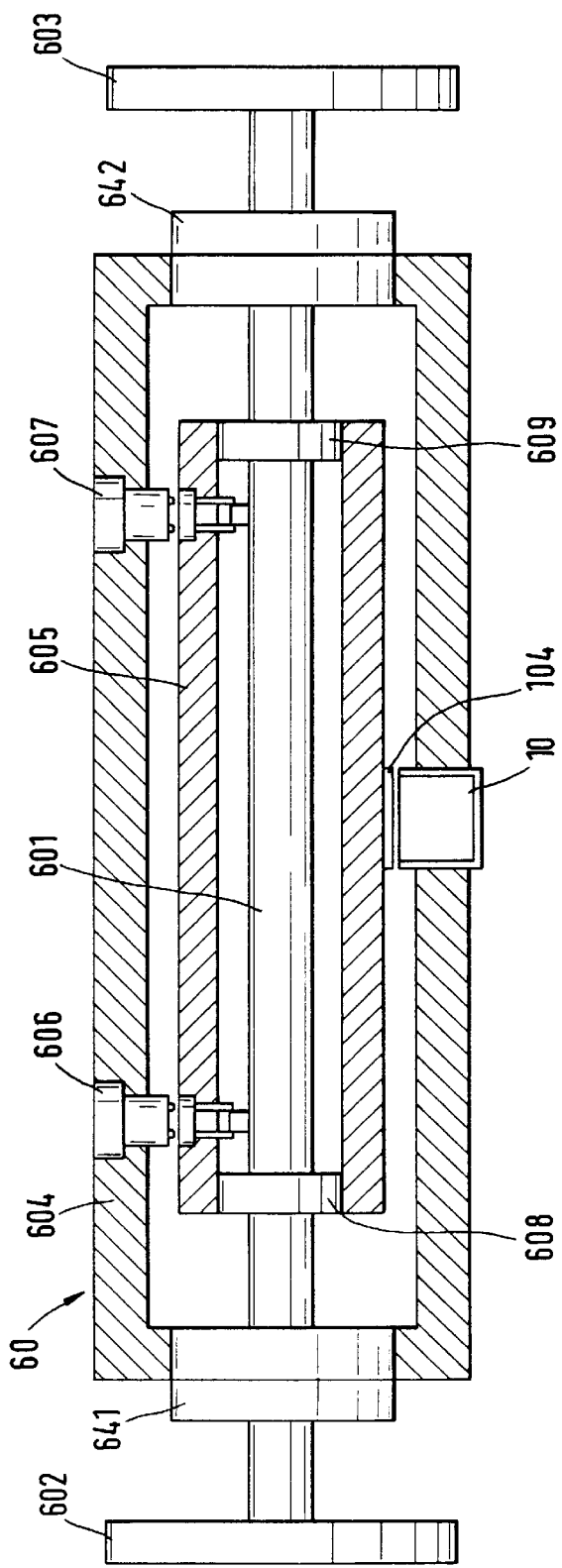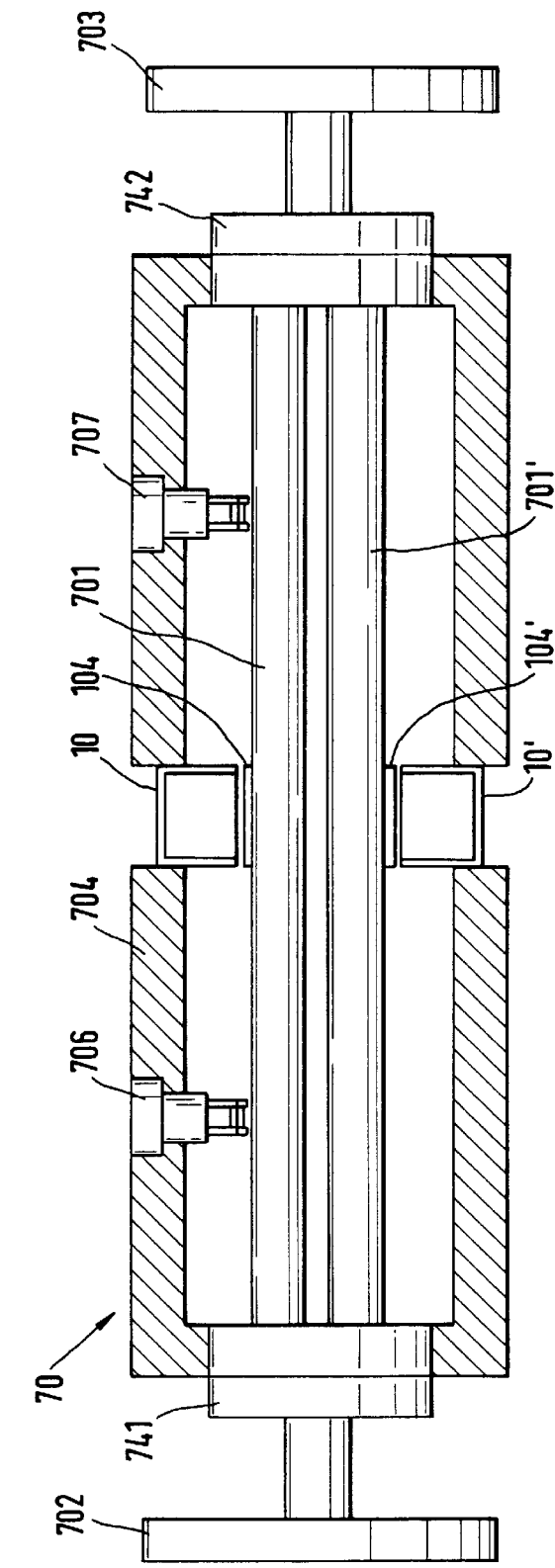

CORIOLIS MASS FLOW SENSOR

This application is a continuation of Provisional Application 60/017,380 filed May 7, 1996, now abandoned.

FIELD OF THE INVENTION

The invention relates to Coriolis mass flow sensors which can each be inserted in a pipeline by means of an inlet-side and an outlet-side connecting element.

BACKGROUND OF THE INVENTION

In the case of mass flow measurement devices which operate on the Coriolis principle, the measurement is based on the fact that, as is known, a fluid which is to be measured and flows through at least one oscillating measuring tube which belongs to an oscillating system and is straight or curved is subject to Coriolis forces. In consequence, the measuring tube oscillates with a phase shift on the input-side sections with respect to the output-side sections. The magnitude of this phase shift is a measure of the mass flow.

The phase shift is picked off by means of oscillation sensors which assign to the mechanical oscillation an electrical variable which is representative of it in terms of magnitude and phase, from which the mass flow is determined electronically.

The oscillations of the measuring tube or the measuring tubes are generally excited by means of electromagnetic exciter arrangements having a permanent magnet, having a core, possibly having an armature and having at least one exciter coil, as is described in detail, for example, in U.S. Pat. No. 5,218,873, U.S. Pat. No. 5,531,126, WO-A 88/02475 or WO-A 93/03336.

The exciter coil is fed from an exciter current source with a coil current as is described, for example, as a phase-locked loop in U.S. Pat. No. 4,801,897, as a result of which the frequency of the coil current is locked to the instantaneous mechanical resonant frequency of the oscillating system, this frequency being dependent on the density of the fluid to be measured, and these two frequencies are thus in general identical.

SUMMARY OF THE INVENTION

Particularly in the case of mass flow sensors of the type described in U.S. Pat. No. 5,531,126 and having a measuring tube and a dummy tube, the mechanical oscillating system resonant frequency differs slightly from the operating frequency of the oscillating system, for example by a few Hertz.

If the oscillating system is now excited by interference vibrations which originate, for example, from the connected pipeline and contain a frequency which is the same as the mechanical resonant frequency of the oscillating system, this excitation, which is caused by interference and is additional to the excitation from the exciter current, corrupts the measurement result.

It is thus an object of the invention to suppress this corruption as optimally as possible.

To this end, the invention consists in a Coriolis mass flow sensor which can be inserted in a pipeline by means of an inlet-side and an outlet-side connecting element, having an oscillating system which comprises at least one measuring tube through which a fluid to be measured flows when operating, having an electromagnetic exciter arrangement for oscillations of the oscillating system which exciter arrangement has at least one low-resistance exciter coil which is fed from an exciter current source, a core which contains a permanent magnet, and an armature, having a capacitor which is coupled to the exciter coil in the manner of a parallel circuit and whose capacitance is selected as a function of the inductance of the exciter coil such that the resonant frequency of the electrical parallel resonant circuit which is formed by the capacitor and the exciter coil is approximately equal to the mechanical resonant frequency of the oscillating system, and having a sensor for the inlet-side oscillations, which is arranged with a distance between the center of the measuring tube and the inlet-side connecting element, and a sensor for the outlet-side oscillations, which is arranged with said distance between the center of the measuring tube and the outlet-side connecting element.

According to a preferred first embodiment of the invention, the capacitor is connected in parallel with a single exciter coil.

According to a preferred second embodiment of the invention, the exciter coil, as a primary coil, and a secondary coil are arranged on the core, and the capacitor is connected in parallel with the secondary coil.

According to a preferred third embodiment of the invention, the core is a tape-wound core.

One advantage of the invention is that the exciter coil with the capacitor coupled to it forms a parallel resonant circuit for the exciter current which is supplied, such that a current peak occurs in the region of its resonant frequency, which produces an exciter force which is greatly increased in comparison with the exciter current which is supplied.

A further advantage of the invention is that mechanical interference oscillations, particularly at a frequency which is the same as the mechanical resonant frequency of the oscillating system, are heavily damped by the capacitor which is coupled to the exciter coil and bridges it. This is a result of the fact that, in contrast to the exciter current source which, as mentioned, feeds a parallel resonant circuit, the electrical equivalent of the interference signal source feeds the low impedance of a series resonant circuit formed by the exciter coil and the capacitor and thus, because of the low resistance of the exciter coil and the low series resonance resistance resulting from this, in practice virtually feeds a short circuit so that the interference-frequency signal is virtually short-circuited and the measurement result can no longer be corrupted.

BRIEF DESCRIPTION OF THE DRAWINGS

The invention will now be explained in more detail with reference to the figures in the drawing, in which an exemplary embodiment is illustrated.

FIG. 3 shows a section of a second variant of an exciter arrangement, FIG. 4 shows a section of a third variant of an exciter arrangement, FIG. 10 shows a partly sectioned longitudinal view of the application of the exciter arrangement to a third type of mass flow sensor, namely having a single straight measuring tube and a dummy tube coaxial to it, and FIG. 11 shows a partly sectioned longitudinal view of the application of the exciter arrangement to a fourth type of mass flow sensor, namely having two parallel measurement tubes.

DETAILED DESCRIPTION OF THE DRAWINGS

Figure 1:
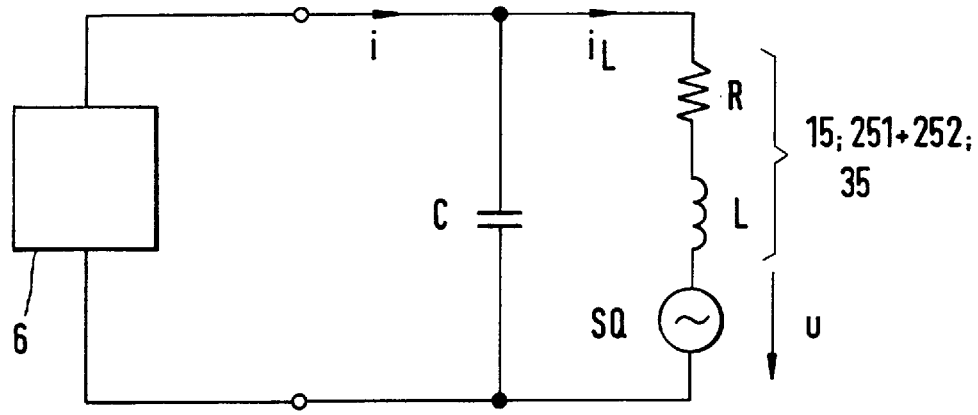
FIG. 1 shows the electrical circuit diagram of an exciter arrangement with an associated exciter current source.

The electrical circuit diagram in FIG. 1, which is partially also the equivalent circuit of an exciter arrangement of an oscillating system of a Coriolis mass flow sensor, shows an ohmic resistance R of an exciter coil 15 or 251+252 or 35, and an inductance L, which is connected in series with it, of this exciter coil.

An interference signal source SQ is furthermore connected in series with this series circuit formed by the resistance R and the inductance L and, in terms of the equivalent circuit, represents an interference voltage u which is always induced in the exciter coil when the oscillating system is excited by the above mentioned interference vibrations. Specifically, the exciter arrangement now acts as an AC generator which produces the interference voltage u.

The series circuit formed from the three parameters, R, L, SQ, assigned to the exciter coil has a capacitor of capacitance C connected in parallel with it. This parallel circuit is fed from an exciter current source 6 with an exciter current i whose frequency is equal to the mechanical resonant frequency of the above mentioned oscillating system. The design of such oscillating systems is explained in more detail further below in conjunction with FIGS. 8 to 11. The exciter current i produces a coil current $i_L$ in the exciter coil.

Arrangements which are described in the prior art of Coriolis mass flow sensors can be used as the exciter current source 6, cf. for example, U.S. Pat. No. 4,801,897, mentioned above.

The capacitance C of the capacitor is to be dimensioned such that the resonant frequency of the electrical parallel resonant circuit formed by the capacitance C and the inductance L, called the electrical resonant frequency in the following text, is approximately equal to the mechanical resonant frequency of the oscillating system.

This dimensioning is based on the known formula for the resonant circular frequency $\Omega$ of an LC resonant circuit: $\Omega^2 = (LC)^{-1}$; of this it follows for C that: $C = (\Omega^2 L)^{-1}$. In this case, $\Omega = 2\pi f$, f being the (electrical) resonant frequency of the LC resonant circuit.

In the case of Coriolis mass flow sensors, the mechanical operating frequency $f_b$ of the oscillating system is generally selected to be equal to its mechanical resonant frequency $f_m$, since this requires the least drive power. This equality ($f_b = f_m$) of the operating frequency and resonant frequency of the oscillating system is, however, not essential, but the oscillating system can also be excited at an operating frequency $f_b$ which differs from the resonant frequency $f_m$ by a frequency difference of several Hertz.

The influence of interference which additionally attempts to excite the mechanical resonant frequency is suppressed or damped by the capacitor not only if the operating frequency and resonant frequency are equal but also in the event of operation with the said frequency difference.

Figure 2:
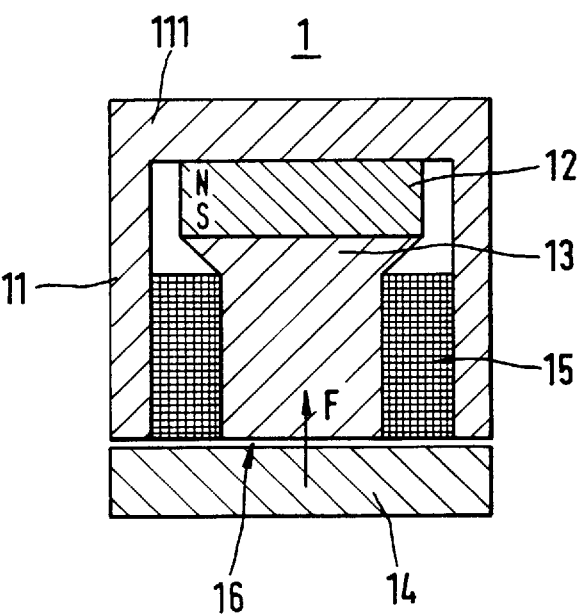
FIG. 2 shows a section of a first variant of an exciter arrangement.

In the case of the first variant of an electromagnetic exciter arrangement 1 which is shown in section in FIG. 2 and is preferably in the form of a circular cylinder, this arrangement comprises a soft-magnetic coil cup 11 having a cup base 111, a core 13 which contains a permanent magnet 12, a soft-magnetic armature 14 and a low-resistance exciter coil 15. The exciter coil 15 is wound on the core 13. The permanent magnet 12 has a north pole N as well as a south pole S, and is arranged between the core 13 and the base 111 of the coil cup 11.

Those ends of the coil cup 11 and of the core 13 which face away from the permanent magnet 12 are aligned and maintain an air gap 16 from the armature 14. If the exciter coil 15 is now fed with the said exciter current i, then a force F acts on the armature.

In contrast to an electrodynamic exciter arrangement, in which a coil moves in a magnetic field, the force F of an electromagnetic exciter arrangement is, according to Maxwell, proportional to the square of the sum of the constant induction $B_{12}$ of the permanent magnet 12 and the alternating induction $B_{15}$ produced by the exciter coil 15: $F \sim (B_{12} + B_{15})^2 = B^2_{12} + 2B_{12}B_{15} + B^2_{15}$ The alternating force $F \approx$ which enables the oscillation excitation is, however, determined just by the second term $2B_{12}B_{15}$ since the term $B^2_{12}$ is constant and the term $B^2_{15}$ is at twice the frequency of the exciter current i which is used by the alternating induction $B_{15}$. As mentioned above, the frequency $f_i$ of the exciter current i is selected to be equal to the mechanical resonant frequency $f_m$ or equal to an operating frequency $f_b$, which is close to resonance, of the oscillating system. The frequency of the term $B^2_{15}$ is therefore twice as high as $f_i$ and is thus well away from the resonant frequency and operating frequency—since $\sin^2 2\pi f_i = 0.5(1 - \cos 4\pi f_i)$—; the term $B^2_{15}$ is thus negligible.

Thus, the alternating force $F\approx$ is given by: $F \approx \sim 2B_{12}B_{15}$. It follows from this that the alternating force $F\approx$ becomes greater the greater the induction $B_{12}$ of the permanent magnet 12 is chosen to be.

In the second variant of an electromagnetic exciter arrangement 2 which is shown in section in FIG. 3 and is preferably planar, this arrangement comprises a U-shaped soft-magnetic tape-wound core 23, in each case one permanent magnet 221, 222, which are arranged at the respective end of the two limbs 231, 232 of said core 23, a soft-magnetic armature 24, and a first low-resistance coil element 251, which is wound on the limb 231, as well as a second low-resistance coil element 252, which is wound on the limb 222.

The two coil elements 251, 252 are connected in series in the same sense and thus form an exciter coil which corresponds to the exciter coil 15 in FIG. 2. There is an air gap 261 and 262 between the permanent magnet 221 and 222, respectively, and the armature 24, across which air gaps the Maxwell force acts.

The third variant of an electromagnetic exciter arrangement 3 which is illustrated in section in FIG. 4 is once again in the form of a circular cylinder and comprises a soft-magnetic cylindrical coil cup 31 and a permanent magnet 32 which is mounted on an inner side of the cup base 311 of the cup 31 and has a magnetic north pole N and a magnetic south pole S. The outer surface of the north pole N of the permanent magnet 32 thus rests against the cup base 311 in FIG. 4.

The electromagnetic exciter arrangement 3 furthermore contains a soft-magnetic core 33 which has a T-shaped longitudinal section and a head plate 331 which rests flat against the permanent magnet 32, that is to say against the outer surface of its south pole S in FIG. 4.

The head plate 331 maintains a first air gap 361 between the inside of the coil cup 31 and a circumferential surface of the head plate 331. The core 33 furthermore has a cylindrical foot 332, on which a low-resistance exciter coil 35 is wound.

The respective end surfaces of the core 33 and coil cup 31 are aligned and maintain a second air gap 362 from an armature 34. The permanent magnet 32 is magnetized in the direction of the longitudinal axis of the coil cup 31, foot 332, and exciter coil 15. The Maxwell force acts between the armature 34 and the second air gap 362.

The Maxwell force is also proportional to the square of the sum of the constant induction of the permanent magnets 221, 222, or of the permanent magnet 32 and of the alternating induction produced by the exciter coil 25 or 35, respectively, in the second variant according to FIG. 3 and the third variant according to FIG. 4.

In the third variant according to FIG. 4, the permanent magnet 32 for an alternating magnetic field produced by the exciter coil 35 itself is equivalent to an air gap whose width is equal to the length dimension of the permanent magnet 32, so that the exciter coil 15 has to feed a magnetic circuit having a high reluctance.

However, the special design of the core 33 results in the alternating magnetic field which is produced in the core 33 by the exciter coil 35 being able to build up in a magnetic circuit which does not contain the permanent magnet 32, so that the reluctance of this magnetic circuit is considerably smaller than, for example, in the case of the first variant.

The magnetic circuit which is fed from the exciter coil 35 is, specifically, composed only of the head plate 331 and the foot 332 of the core 33, that part of the coil cup 31 which lies toward the opening, the armature 34 and the two air gaps 361, 362. In addition, the permanent magnet 32 has its own magnetic circuit which, specifically, is closed via the base 311 and the adjacent parts of the coil cup 31 as well as the head plate 331 and the first air gap 361.

Figure 5:
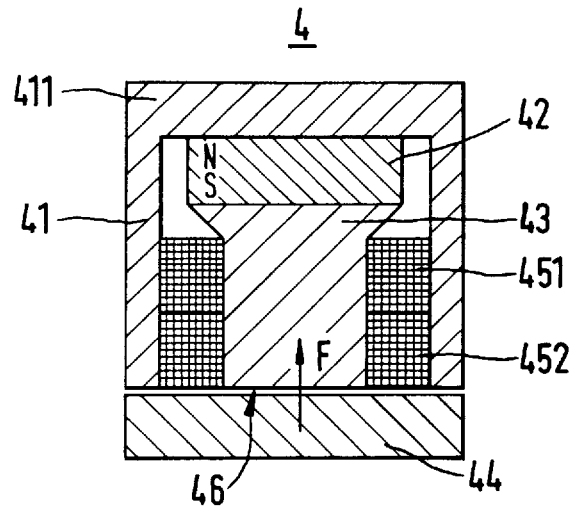
FIG. 5 shows a section of a development of the first variant of the exciter arrangement.

FIG. 5 shows a further development of the exciter arrangement 1 according to FIG. 2 in the form of an exciter arrangement 4 which is preferably in the form of a circular cylinder, and, to be precise, the exciter coil 15 there is designed as a primary coil 451 which interacts with a low-resistance secondary coil 452, in a transformer-like manner.

Furthermore, the exciter arrangement 4 comprises a soft-magnetic armature 44, a core 43 which contains a permanent magnet 42, and a soft-magnetic coil cup 41 having a cup base 411. The two coils 451, 452 are wound on the core 43. The permanent magnet 42 has a north pole N as well as a south pole S and is arranged between the core 43 and the base 411 of the coil cup 41.

Those ends of the core 43 and of the coil cup 41 which face away from the permanent magnet 42 are aligned and maintain an air gap 46 from the armature 44. If the primary coil 451 is now fed with the said exciter current i, then the force F mentioned above acts on the armature again.

Figure 6:
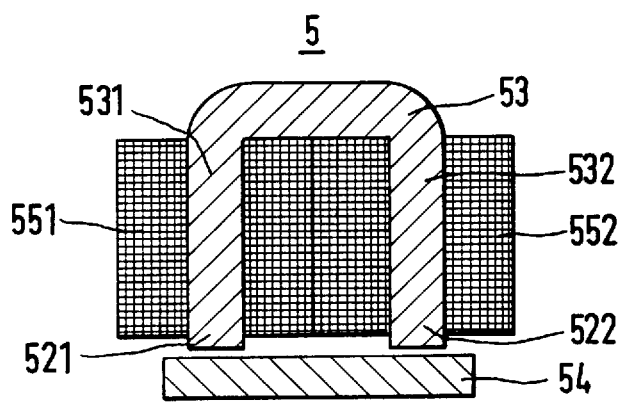
FIG. 6 shows a section of a development of the second variant of the exciter arrangement.

FIG. 6 shows a further development of the exciter arrangement 2 according to FIG. 3 in the form of an exciter arrangement 5 which is preferably planar, and, to be precise, the exciter coil 25 there is designed as a primary coil 551 which interacts with a low-resistance secondary coil 552 in a transformer-like manner.

The exciter arrangement 5 furthermore comprises a U-shaped soft-magnetic tape-wound core 53, a permanent magnet 521, which is arranged at the end of the two 531, and a permanent magnet 522, which is arranged at the end of the limb 532 of said core 53, and a soft-magnetic armature 54. The primary coil 551 is wound on the limb 531, and the low-resistance secondary coil 552 is wound on the limb 532.

There is an air gap 561 and 562 between the permanent magnets 521 and 522, respectively, and the armature 54, across which air gaps the Maxwell force acts.

Figure 7:
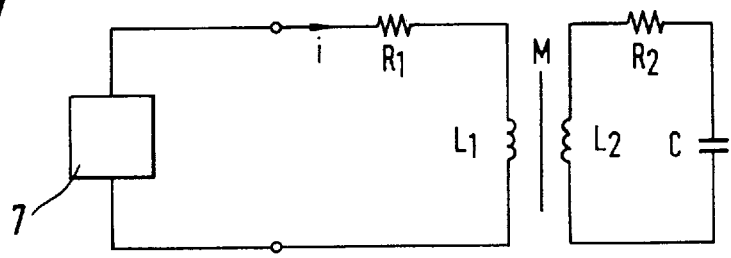
FIG. 7 shows the electrical circuit diagram of the developments according to FIGS. 5 and 6.

The electrical circuit diagram in FIG. 7, which is partially also the equivalent circuit of the exciter arrangements 4 and 5 in FIGS. 5 and 6, respectively, shows, on the secondary side, a low resistance $R_2$ of the secondary coil 452 and 552, respectively, and an inductance $L_2$ of this secondary coil, connected in series with it. This series circuit formed from the resistance $R_2$ and the inductance $L_2$ has a capacitor of capacitance C connect-ed in parallel with it.

On the primary side, an ohmic resistance $R_1$ of the primary coil 451 and 551, respectively, is connected in series with an inductance $L_1$ of this primary coil. A mutual inductance M results since the primary coil 451 and 551 and the secondary coil 452 or 552, respectively, are magnetically coupled to one another by the core 43 and 53, respectively. Because of this coupling, the capacitor of capacitance C is coupled to the primary side and is connected in parallel with it in a transformer-like manner.

The series circuit formed from the resistance $R_1$ and the inductance $L_1$ on the primary side is fed from an exciter current source 7 with an exciter current i whose frequency is equal to the mechanical resonant frequency of the oscillating system of a Coriolis mass flow sensor.

The capacitance C of the capacitor is to be dimensioned such that the electrical resonant frequency of the parallel resonant circuit which is formed by the capacitance C and the inductance $L_2$ is approximately equal to the mechanical resonant frequency of the oscillating system. The electrical resonant frequency and the mechanical resonant frequency thus differ slightly from one another by a resonant frequency difference which may be, for example, a few Hertz in the case of resonant frequencies in the order of 1 kHz.

The transformer coupling of the capacitor can also be provided in the case of the exciter arrangement in FIG. 4, in that a secondary coil is provided in addition to the exciter coil 35 in FIG. 4 as primary coil.

Exciter arrangements according to FIGS. 2 to 6 or other exciter arrangements are used to excite an oscillating system which, in operation, comprises at least one measuring tube through which a fluid which is to be measured flows, and which is part of a mass flow measurement device which operates on the Coriolis principle. The oscillating system is mechanically coupled to the respective exciter arrangement 1, 2, 3, 4, 5 by means of the respective armature 14, 24, 34, 44, 54.

FIGS. 8 to 11 show four different types of Coriolis mass flow sensors, each of which can be excited to oscillate by an exciter arrangement 10 and, for example, corresponding to FIGS. 2 to 6. The respective exciter arrangements are therefore indicated only schematically in FIGS. 8 to 11, without specifying the respective structure in terms of the drawing.

Figure 8:
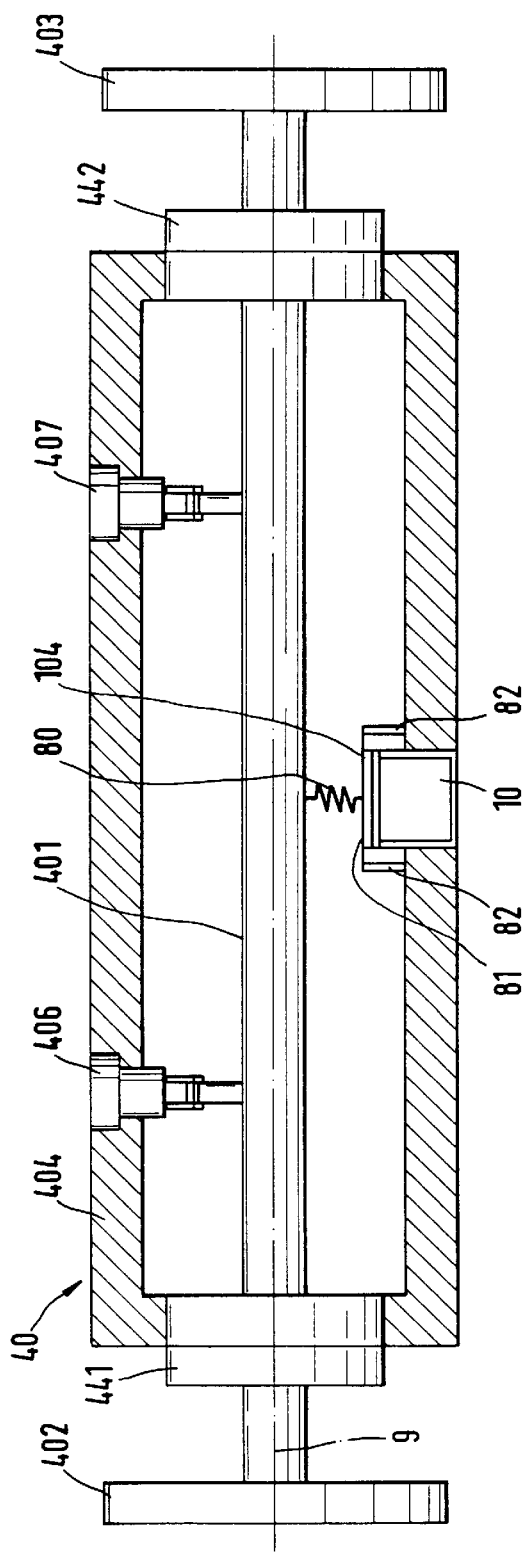
FIG. 8 shows a partly sectioned longitudinal view of the application of the exciter arrangement to a first type of mass flow sensor, namely having a single measurement tube.

FIG. 8 shows a rather schematic and partly sectioned longitudinal view of a mass flow sensor 40 having a single measuring tube 401 which can be connected via flanges 402, 403 to a pipeline which is not illustrated and in which a fluid flows whose mass flow is to be measured.

The measuring tube 401 is clamped at its ends by means of end pieces 441, 442 in a supporting frame 404 which is designed as a supporting tube such that, if it is straight, as is the case illustrated in FIG. 8, it can be excited to oscillate like a bar.

To this end, the electromagnetic exciter arrangement 10 is incorporated with its associated coil cup in the wall of the supporting frame 404 and is mounted in it, to be precise at its center on the longitudinal side. The associated armature 104 is mechanically connected to the measuring tube 401 via a body which is designed as a spiral spring 80. Furthermore, the armature 104 is mechanically connected to the supporting frame 404 via a membrane 81 and a membrane holder 82. The armature 104 is thus mounted such that it can oscillate, and its oscillations are transmitted to the measuring tube 401 by means of the spiral spring 80.

The oscillating system here comprises the measuring tube 401, the spiral spring 80, the armature 104 and the membrane 21. The armature 104 in this case carries out the function of a body which oscillates in antiphase to the measuring tube 401.

Two sensors 406, 407 are mounted on the side of the supporting frame 404 opposite the mounting point of the exciter arrangement 10 and within said supporting frame 404 at a respective distance from the center of the measuring tube 401, in order to measure the oscillations of said measuring tube 401.

As can be seen in FIG. 8, the measuring tube 401 may be straight or it may be curved to a greater or lesser extent in a plane at right angles to the plane of the drawing; for example the measuring tube 401 may be bent in a U-shape or a Ω-shape.

In this case, the exciter arrangement 10 then expediently acts on the apex point of the U or of the Ω, and the supporting frame 404 extends up to this point. The bent, in particular, U-shaped or Ω-shaped, measuring tube 401 in this case carries out bending oscillations about an axis which is identical to the longitudinal axis 9 in FIG. 8. The oscillation sensors are assigned to parts of the measuring tube which are between the one and the other end piece, respectively, and the apex point.

Figure 9:
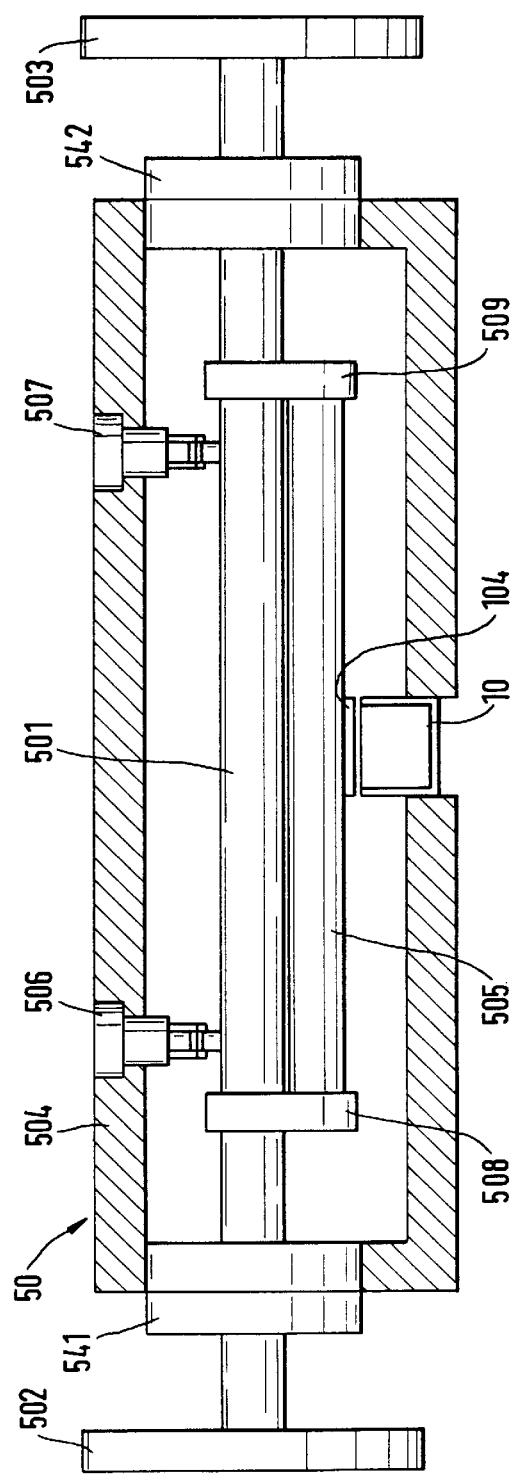
FIG. 9 shows a partly sectioned longitudinal view of the application of the exciter arrangement to a second type of mass flow sensor, namely having a single straight measuring tube and a dummy tube parallel to it.

FIG. 9 shows, rather schematically and in a partly sectioned longitudinal view, a mass flow sensor 50 having a single measuring tube 501 which can be connected via flanges 502, 503 to the pipeline, which is not illustrated again and carries the fluid to be measured.

The measuring tube 501 is clamped at its ends by means of end pieces 541, 542 in a supporting frame 504 which is designed as a supporting tube, such that, as it is straight as illustrated in FIG. 9 and as it is the only reasonable shape for this second type, it can be excited to oscillate like a bar.

To this end, the electromagnetic exciter arrangement 10 is incorporated with its coil cup in the wall of the supporting frame 504 and is mounted in it, to be precise at its longitudinal center. The associated armature 104 is mounted on a body which is designed as a straight dummy tube 505 running parallel to the straight measuring tube 501 and is mechanically connected to the measuring tube 501 by means of in each case one node plate 508, 509 at the ends.

The armature 104 is thus mounted such that it can oscillate, and its oscillations are transmitted to the measuring tube 501 by means of the dummy tube 505. The oscillating system in this case comprises the measuring tube 501, the dummy tube 505 and the armature 104.

Two sensors 506, 507 are mounted on the side of the supporting frame 504 opposite the mounting point of the exciter arrangement 10 and within said supporting frame 504 at a respective distance from the center of the measuring tube 501, in order to measure the oscillations of the measuring tube 501.

FIG. 10 shows, rather schematically and in a partly sectioned longitudinal view, a mass flow sensor 60 having a single measuring tube 601 which can be connected via flanges 602, 603 to the pipeline, which is not illustrated again and carries the fluid to be measured.

The measuring tube 601 is clamped at its ends by means of end pieces 641, 642 in a supporting frame 604 which is designed as a supporting tube, such that, as it is straight as illustrated in FIG. 10 and as it is the only reasonable shape for this third type, it can be excited to oscillate like a bar.

To this end, an electromagnetic exciter arrangement 10 is incorporated with its coil cup in the wall of the supporting frame 604 and is mounted in it, to be precise at its longitudinal center. The associated armature 104 is mounted on a body which is designed as a dummy tube 605 running coaxially to the straight measuring tube 601 and is mechanically connected to the measuring tube 601 by means of in each case one end plate 608, 609.

The armature 104 is thus mounted such that it can oscillate, and its oscillations are transmitted to the measuring tube 601 by means of the dummy tube 605. The oscillating system in this case com-prises the measuring tube 601, the coaxial dummy tube 605 and the armature 104.

Two sensors 606, 607 are mounted on the side of the supporting frame 604 opposite the mounting point of the exciter arrangement 10 and within said supporting frame 604 at a respective distance from the center of the measuring tube 601, in order to measure the oscillations of the measuring tube 601.

The basic structure of the mass flow sensor in FIGS. 9 and 10 corresponds to the arrangements in FIGS. 1 and 2, respectively, of WO-A 95/03528.

FIG. 11 shows, rather schematically and in a partly sectioned longitudinal view, a mass flow sensor 70 having two parallel measurement tubes 701, 701' which can be connected via flanges 702, 703 to the pipeline, which is not illustrated again and carries the fluid to be measured.

The measuring tubes 701, 701' are clamped at its ends by means of end pieces 741, 742 in a supporting frame 704 which is designed as a supporting tube so that, if they are straight, they can be excited to oscillate like bars.

To this end, a first electromagnetic exciter arrangement 10 is incorporated with its coil cup in the wall of the supporting frame 704 and is mounted in it, to be precise at its longitudinal center. The associated armature 104 is mounted on the measuring tube 701.

A second electromagnetic exciter arrangement 10' is incorporated with its coil cup in the wall of the supporting frame 704 on the side of the supporting frame 704 opposite the mounting point of the exciter arrangement 10 and is mounted therein, to be precise at its longitudinal center again. The associated armature 104' is mounted on the measuring tube 701'.

The armatures 104, 104' are thus each mounted such that they can oscillate, and their oscillations are in each case transmitted to the measuring tubes 701, 701'. The oscillating system in this case comprises the two measuring tubes 701, 701' and the two armatures 104, 104'.

Furthermore, two sensors 706, 707 are mounted on the side of the supporting frame 704 opposite the mounting point of the exciter arrangement 10 and within said supporting frame 704 at a respective distance from the center of the measuring tube 701', in order to measure the oscillations of said measuring tube 701'.

The two measuring tubes 701, 701' are excited by means of the two exciter arrangements 10, 10' such that, if they are straight, they oscillate with respect to one another in the plane of the drawing, that is to say they carry out movements toward one another or away from one another.

The two measuring tubes 701, 701' may be straight, as can be seen in FIG. 11, or they may run parallel to one another in each case in a plane which is at right angles to the plane of the drawing, and they may be curved to a greater or lesser extent; for example, the measuring tubes 701, 701' may each be bent in a U-shape or Ω-shape.

In this case, the exciter arrangements 10, 10' then expediently act in each case on the apex point of the U or of the Ω, and the supporting frame 704 extends up to this point. The bent, in particular, U-shaped or Ω-shaped, measuring tubes in this case carry out bending oscillations about a respective axis which is identical to the respective longitudinal axis of the measuring tubes 701, 701' in FIG. 11. The oscillation sensors are assigned to parts of the respective measuring tube which are between in each case one end piece and the respective apex point.

Particularly in the case of three types of mass flow sensors which have been explained with reference to FIGS. 8 to 10, the operating frequency of the oscillating system differs slightly from its mechanical resonant frequency, as explained above. If the oscillating system is now excited at its resonant frequency by interference vibration originating from the connected pipeline, this vibration corrupts the measurement result.

This corruption is canceled out according to the invention in that the capacitor of capacitance C, explained above, is coupled to the exciter coil like a parallel circuit, preferably being connected directly in parallel with the exciter coil. The capacitance C is selected as a function of the inductance of the exciter coil such that the resonant frequency of the electrical series resonant circuit formed by the capacitor and exciter coil is approximately equal to the mechanical resonant frequency of the oscillating system.

In consequence, the electrical equivalent of the interference signal source which, in FIG. 1, produces the interference voltage u in the event of interference vibrations "sees" the low series resonance impedance of this series resonant circuit and thus, in practice, virtually a short circuit, so that the interference-frequency signal can no longer corrupt the measurement result.

Mechanical oscillations, particularly at a frequency corresponding to the mechanical resonant frequency, are thus heavily damped by the exciter arrangement with a parallel coupled, in particular parallel connected, capacitor.

We claim:

1. A Coriolis mass flow sensor which can be inserted in a pilpeline by means of an inlet-side and an outlet-side connecting element,
    having an oscillating system which comprises at least one measuring tube through which a fluid to be measured flows when operating,
    having an electromagnetic exciter arrangement for oscillations of the oscillating system
        which exciter arrangement has at least one low-resistance exciter coil which is fed from an exciter current source, a core which contains a permanent magnet, and an armature,
    having a capacitor which is coupled to the exciter coil in the manner of a parallel circuit and whose capacitance is selected as a function of the inductance of the exciter coil such that the resonant frequency of the electrical parallel resonant circuit which is formed by the capacitor and the exciter coil is approximately equal to the mechanical resonant frequency of the oscillating system, and having a sensor for the inlet-side oscillations, which is arranged with a distance between the center of the measuring tube and the inlet-side connecting element, and a sensor for the outlet-side oscillations, which is arranged with said distance between the center of the measuring tube and the outlet-side connecting element wherein the exciter coil, as the primary coil, and a secondary coil are arranged on the core, and the capacitor is connected in parallel with the secondary coil.

2. A Coriolis mass flow sensor which can be inserted in a pipeline by means of an inlet-side and an outlet-side connecting element,
    having an oscillating system which comprises at least one measuring tube through which a fluid to be measured flows when operating,
    having an electromagnetic exciter arrangement for oscillations of the oscillating system
        which exciter arrangement has at least one low-resistance exciter coil which is fed from an exciter current source, a tape wound core which contains a permanent magnet, and an armature,
    having a capacitor which is coupled to the exciter coil in the manner of a parallel circuit and whose capacitance is selected as a function of the inductance of the exciter coil such that the resonant frequency of the electrical parallel resonant circuit which is formed by the capacitor and the exciter coil is approximately equal to the mechanical resonant frequency of the oscillating system, and having a sensor for the inlet-side oscillations, which is arranged with a distance between the center of the measuring tube and the inlet-side connecting element, and a sensor for the outlet-side oscillations, which is arranged with said distance between the center of the measuring tube and the outlet-side connecting element.

3. A Coriolis mass flow sensor which can be inserted in a pipeline by means of an inlet-side and an outlet-side connecting element,
    having an oscillating system which comprises at least one measuring tube through which a fluid to be measured flows when operating,
    having an electromagnetic exciter arrangement for oscillations of the oscillating system
        which exciter arrangement has at least one low-resistance exciter coil which is fed from an exciter current source, a core which contains a permanent magnet, and an armature,
    having a capacitor which is coupled to the exciter coil in the manner of a parallel circuit and whose capacitance is selected as a function of the inductance of the exciter coil such that the resonant frequency of the electrical parallel resonant circuit which is formed by the capacitor and the exciter coil is approximately equal to the mechanical resonant frequency of the oscillating system, and having a sensor for the inlet-side oscillations, which is arranged with a distance between the center of the measuring tube and the inlet-side connecting element, and a sensor for the outlet-side oscillations, which is arranged with said distance between the center of the measuring tube and the outlet-side connecting element wherein the exciter coil, as the primary coil, and a secondary coil are arranged on the core, and the capacitor is connected in parallel with the secondary coil.

4. A Coriolis mass flow sensor which can be inserted in a pipeline by means of an inlet-side and an outlet-side connecting element, having an oscillating system which comprises at least one measuring tube through which a fluid to be measured flows when operating, having an electromagnetic exciter arrangement for oscillations of the oscillating system which exciter arrangement has at least one low-resistance exciter coil which is fed from an exciter current source, a tape wound core which contains a permanent magnet, and an armature, having a capacitor which is coupled to the exciter coil in the manner of a parallel circuit and whose capacitance is selected as a function of the inductance of the exciter coil such that the resonant frequency of the electrical parallel resonant circuit which is formed by the capacitor and the exciter coil is approximately equal to the mechanical resonant frequency of the oscillating system, and having a sensor for the inlet-side oscillations, which is arranged with a distance between the center of the measuring tube and the inlet-side connecting element, and a sensor for the outlet-side oscillations, which is arranged with said distance between the center of the measuring tube and the outlet-side connecting element.

5. A Coriolis mass flow sensor which can be inserted in a pipeline by means of an inlet-side and an outlet-side connecting element, having an oscillating system which comprises at least one measuring tube through which a fluid to be measured flows when operating, having an electromagnetic exciter arrangement for oscillations of the oscillating system which exciter arrangement has at least one low-resistance exciter coil which is fed from an exciter current source, a tape-wound core which contains a permanent magnet, and an armature, having a capacitor which is coupled to the exciter coil in the manner of a parallel circuit and whose capacitance is selected as a function of the inductance of the exciter coil such that the resonant frequency of the electrical parallel resonant circuit which is formed by the capacitor and the exciter coil is approximately equal to the mechanical resonant frequency of the oscillating system, and having a sensor for the inlet-side oscillations, which is arranged with a distance between the center of the measuring tube and the inlet-side connecting element, and a sensor for the outlet-side oscillations, which is arranged with said distance between the center of the measuring tube and the outlet-side connecting element.

wherein the capacitor is connected in parallel with the exciter coil.

6. The Coriolis mass flow sensor as claimed in claim 3, in which the core is a tape-wound core.

* * * * *